UNITED STATES PATENT OFFICE.

LOUIS H. FLANDERS, OF JENKINTOWN, PENNSYLVANIA.

PASTE FOR STORAGE-BATTERY PLATES AND PROCESS OF MAKING THE SAME.

1,228,546.  Specification of Letters Patent.  Patented June 5, 1917.

No Drawing.  Application filed October 20, 1913. Serial No. 796,114.

*To all whom it may concern:*

Be it known that I, LOUIS H. FLANDERS, a citizen of the United States, residing at Jenkintown, in the county of Montgomery and State of Pennsylvania, have invented a certain new and useful Paste for Storage-Battery Plates and Process of Making the Same, of which the following is a specification.

The principal objects of the present invention are, first, to provide a smooth paste free from lumps and one which is neutral or slightly alkaline and one that sets slowly and can be kept in plastic condition in large masses for long periods; second, to provide a paste which may be satisfactorily applied to grids by means of machinery or mechanical pasters; and third, to provide a paste from which plates of uniform and pre-determined porosity or specific density can be made, and this even though the paste is made from varying raw material and under varying conditions of weather.

The paste is made by mixing the oxid or oxids of lead, including so-called finely divided lead, which as a matter of fact is always somewhat oxidized, which may have been previously wet or dampened with water with that definite quantity of dilute sulfuric acid solution or other sulfating solution which is appropriate for producing in the paste the appropriate amount of sulfate for insuring the required porosity and thereafter and after the sulfate forming reaction is completed, tempering the paste, if necessary, with additional water to the required consistency for pasting. Inasmuch as the oxids are first mixed with water, a considerable quantity of strong sulfuric acid solution can be slowly added without producing a violent chemical re-action and with the formation of a smooth homogeneous paste containing a greater amount of sulfate than it would be possible to form if a weak solution of acid were used, since in the latter case and in order to produce the desired quantity of sulfate it would be necessary to introduce so much water contained in the acid solution that the paste would be too fluid. On the other hand, if strong acid were added to dry oxids the re-action would be so violent that the sulfates would not be uniformly distributed and even if the paste were afterward tempered with water it would be gritty and lumpy. By using a comparatively strong sulfuric acid solution or sulfuric acid solutions of different strengths, the amount of lead sulfate formed and hence the porosity of the finished plate can be varied within wide limits. The total amount of such solution will be comparatively small even where a comparatively large percentage of sulfate is desired. Upon completion of the sulfating re-action and after the desired quantity of sulfate has been formed the paste is ready for application to the grids. If the paste is too thick it can be tempered by the addition of sufficient water for that purpose. It will thus be seen that there is in the paste combined lead sulfate which is a porosity giving agent in the proportion for giving the required porosity, and further that the paste is of the consistency required or can be made to have the desired plasticity by the addition of water. Inasmuch as the paste contains combined lead sulfate it is chemically non-setting and almost neutral or slightly alkaline, and it is free from lumps and is smooth. It can therefore be advantageously used in connection with mechanical pasters. If allowed to dry the paste is chalky and of soft consistency and in that regard is as good as other known plates but no better. However, it is better and substantially different in respect to other characteristics herein pointed out. However, the paste has the property that after application to grids and while wet, pickling or soaking in sulfating material, such as a weak solution of ammonium sulfate or sulfuric acid, produces a further re-action with the surplus lead oxid which results in causing the paste to set in a hard homogeneous structure. When plates pasted with this paste are formed, they will uniformly have the desired porosity which is controlled by the quantity of combined sulfates originally present in the paste.

What I claim is:

1. The method of making storage battery paste of any desired lead content per unit of volume from varying oxids of lead, which consists in mixing the lead oxid with sufficient water to make a paste and mixing said paste with sulfuric acid of strength adapted to preserve the required consistency of the paste and in quantity to produce lead sulfate in appropriate quantity for increasing the volume of the water paste to give a pre-determined lead content per unit of volume and leave sulfatable oxids present, substantially as described.

2. A non-setting storage battery paste of dough-like or pasty consistency having its lead content per unit of volume fixed by the quantitative relation of contained lead sulfate and other lead content a portion of which is adapted to re-act with sulfating material to chemically set the paste.

In testimony whereof I have hereunto signed my name.

L. H. FLANDERS.

Witnesses:
W. W. McMahon,
Albert N. Dingee.